(12) United States Patent
Bartlett et al.

(10) Patent No.: US 11,104,284 B2
(45) Date of Patent: Aug. 31, 2021

(54) ENHANCED DISCRIMINATION METHOD AND APPARATUS FOR CONTROLLING AN ACTUATABLE RESTRAINING DEVICE

(71) Applicant: ZF ACTIVE SAFETY AND ELECTRONICS US LLC, Livonia, MI (US)

(72) Inventors: Charles A. Bartlett, Commerce Township, MI (US); Huahn Yeh, Novi, MI (US); Raymond David, Dearborn Heights, MI (US); Kim Kyoungwang, Seoul (KR); Sonia Gupta, Farmington, MI (US); Masashi Nagai, Novi, MI (US); Kyeora Lee, Seoul (KR); Yuxiao Wu, Ann Arbor, MI (US)

(73) Assignee: ZF ACTIVE SAFETY AND ELECTRONICS US LLC, Livonia, MI (US)

( * ) Notice: Subject to any disclaimer, the term of this patent is extended or adjusted under 35 U.S.C. 154(b) by 530 days.

(21) Appl. No.: 15/651,053

(22) Filed: Jul. 17, 2017

(65) Prior Publication Data

US 2019/0016286 A1 Jan. 17, 2019

(51) Int. Cl.
*B60R 21/01* (2006.01)
*B60R 21/0132* (2006.01)
(Continued)

(52) U.S. Cl.
CPC .... *B60R 21/01336* (2014.12); *B60R 21/0132* (2013.01); *G06K 7/10178* (2013.01); *G07C 5/008* (2013.01); *G07C 5/085* (2013.01); *B60R 2021/01115* (2013.01); *G06F 19/00* (2013.01); *G07C 5/0808* (2013.01)

(58) Field of Classification Search
CPC ..... B60R 21/01336; B60R 2021/01115; B60R 21/0132; G07C 5/008; G07C 5/085; G07C 5/0808; G06K 7/10178; G06F 19/00
See application file for complete search history.

(56) References Cited

U.S. PATENT DOCUMENTS

| | | |
|---|---|---|
| 6,170,864 B1 | 1/2001 | Fujita et al. |
| 7,147,246 B2 | 12/2006 | Breed et al. |
| (Continued) | | |

FOREIGN PATENT DOCUMENTS

| | | |
|---|---|---|
| GB | 2436692 | 3/2007 |
| WO | 2011069939 A1 | 6/2011 |

OTHER PUBLICATIONS

Calspan "2018 NCAP—The Standards are Changing: Test With the Best" [online] published Jul. 1, 2017.
(Continued)

*Primary Examiner* — Michael V Kerrigan
(74) *Attorney, Agent, or Firm* — Tarolli, Sundheim, Covell & Tummino LLP

(57) ABSTRACT

A method for controlling an actuatable restraining device includes sensing a plurality of crash event indications in response to a crash event. The method also includes classifying the crash event in response to comparing the sensed crash event indications against one another to identify an oblique moving deformable barrier crash event. The method further includes controlling deployment timing of the actuatable restraining device in response to the classification of the crash event.

26 Claims, 11 Drawing Sheets

(51) Int. Cl.
*G06K 7/10* (2006.01)
*G07C 5/00* (2006.01)
*G07C 5/08* (2006.01)
*G06F 19/00* (2018.01)

(56) References Cited

U.S. PATENT DOCUMENTS

| | | |
|---|---|---|
| 9,327,666 B2 | 5/2016 | Sassi et al. |
| 9,650,006 B2 | 5/2017 | Foo et al. |
| 2015/0266439 A1* | 9/2015 | Foo .................... B60R 21/0132 701/45 |

OTHER PUBLICATIONS

PCT/US17/42302 International Search Report and Written Opinion completed Sep. 18, 2017.

* cited by examiner

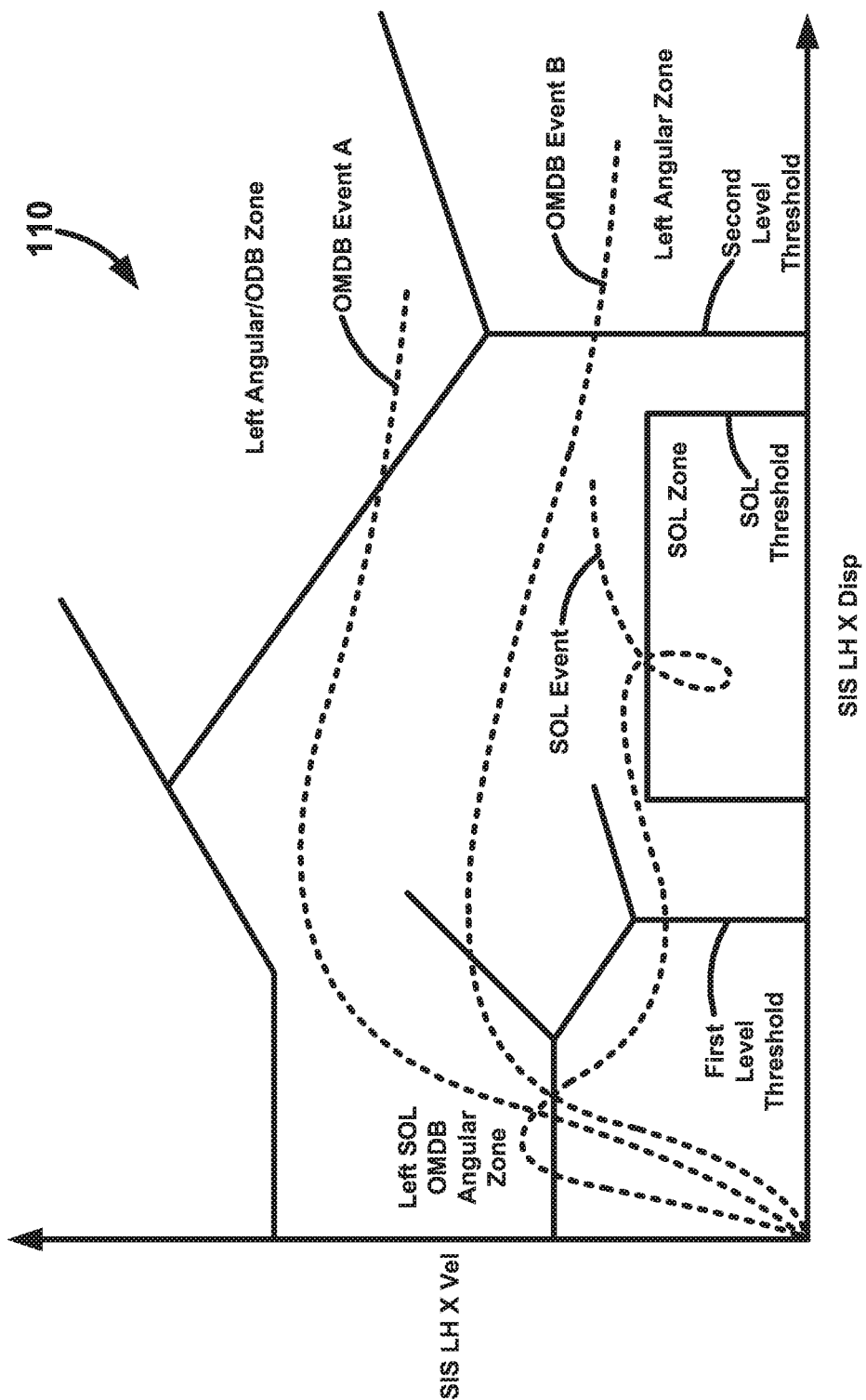

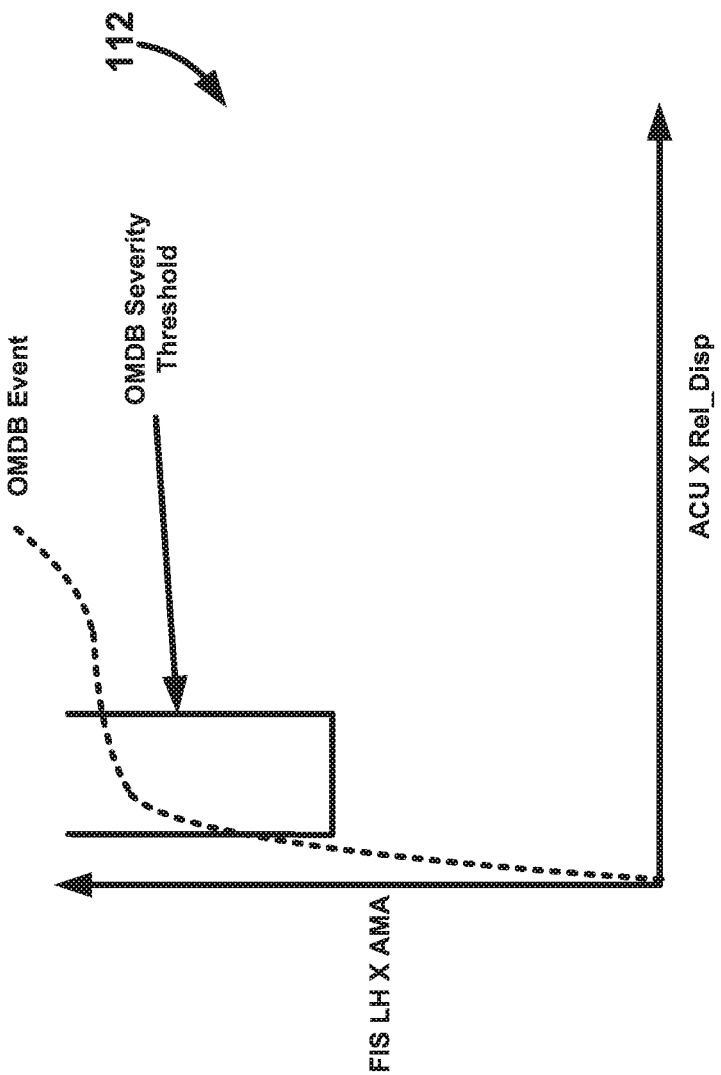

ENHANCED DISCRIMINATION METHOD AND APPARATUS FOR CONTROLLING AN ACTUATABLE RESTRAINING DEVICE

TECHNICAL FIELD

The present invention relates to a method and apparatus for controlling a vehicle actuatable occupant restraining device, and, in particular, to a method and apparatus for discriminating among several types of vehicle crash events. The enhanced discrimination method and apparatus provides the ability to identify and discriminate amongst the occurrence of an oblique moving deformable barrier crash event, a high speed frontal rigid barrier crash event, an offset deformable barrier crash event, an oblique/angular frontal rigid barrier crash event, and a small/narrow overlap crash event.

BACKGROUND

Actuatable vehicle occupant restraining systems, such as actuatable seatbelts and airbags, often include a plurality of event sensors, such as accelerometers, and an electronic control unit ("ECU") that monitors the sensors. The ECU makes a determination, based on the signals from the sensors, if the occupant restraining system should be actuated. In early actuatable restraining systems, mechanical sensor switches were used for deployment control. Later, other types of event sensors, such as accelerometers, were developed and used. The simplest example of such a restraining system using an accelerometer used the accelerometer for measuring crash acceleration as a function of time. A controller monitored the output signal of the accelerometer and determined if the crash acceleration as a function of time was greater than a predetermined value, and, if so, the restraint was actuated.

For vehicle safety systems, it is desirable to discriminate amongst the various collision or impact events in which a vehicle can be involved. If the vehicle safety system can discriminate or identify the crash event as being of a particular type, the actuatable restraints can be actuated in a manner tailored to that particular type of crash event.

"Vehicle crash events," as used herein, is meant to encompass collisions or impacts that may or may not be associated with a vehicle crash in the typical sense. For example, a vehicle crash event, as used herein, can be meant to refer to a collision or impact in the typical sense, where actuation of an occupant restraint is expected, such as a collision with a deformable barrier, such as another vehicle or a non-deformable barrier, such as a tree or utility pole. A vehicle crash event, as used herein, can also be meant to refer to a collision or impact in the non-typical sense, where actuation of an occupant restraint may not be expected, such as an undercarriage snag.

Vehicle safety systems can be configured or adapted to discriminate those crash events for which deployment of the actuatable occupant restraints is desired ("deployment crash events") from those crash events for which deployment of the actuatable occupant restraints is not desired ("non-deployment crash events"). For example, using the aforementioned examples, an vehicle safety system can be configured or adapted to detect a vehicle collision or impact with a deformable or non-deformable barrier and identify that impact or collision as a deployment crash event. In this example, the vehicle safety system can also be configured or adapted to detect a vehicle undercarriage snag and identify that impact or collision as a non-deployment crash event. In this description, the discrimination performed by the occupant restraining system functions to "catch" the deployment crash events and to "filter out" or "not catch" the non-deployment crash events.

Complicating the issue further is that discrimination schemes implemented in actuatable occupant restraint systems are vehicle platform dependent. What may work to catch deployment crash events and filter out non-deployment crash events on one vehicle platform may not work on another vehicle platform.

Several patent publications have been issued describing methods and apparatuses for discriminating between deployment and non-deployment crash events. For example, U.S. Pat. No. 6,776,435 discloses a method and apparatus for controlling an actuatable restraining device using switched thresholds based on use of a crush zone sensor. U.S. Pat. No. 7,359,781 discloses a method and apparatus for determining symmetric and asymmetric crash events with improved misuse margins. U.S. Pat. No. 7,625,006 discloses a method and apparatus for controlling an actuatable restraining device using crush zone sensors for a safing function. U.S. Pat. No. 8,118,130 discloses a method and apparatus for controlling an actuatable restraining device using XY crush zone satellite accelerometers, i.e., multi-axis sensors. The teachings of each of these publications are hereby incorporated by reference in their entireties. Additionally, WO 2014/089026 A1 discloses a system and method for implementing an enhanced discrimination algorithm for classifying the crash events described above. The teachings of this publication is hereby incorporated herein in its entirety.

From the above, it will be appreciated that it can be desirable to control the actuation and timing of the occupant protection devices in the safety system in response to the type and/or severity of the crash event in which the vehicle is involved. To determine which occupant protection devices to actuate in response to a sensed crash event, the safety system can implement a crash evaluation process to discriminate between types of crash events. To develop and implement a crash evaluation process requires testing in a highly controlled environment in order to determine if the process is capable of providing the desired degree of discrimination.

For example, with respect to frontal crash events, it can be desirable to discriminate between full frontal crash events, offset frontal crash events, oblique/angular crash events, and small overlap crash events.

Full frontal crash events are considered to be crash events where the frontal impact is parallel or substantially parallel to the vehicle longitudinal axis ($X_{VEH}$) and there is full-overlap with respect to the LH and RH side of the vehicle. The ability to discriminate a full frontal crash event can be evaluated and verified, for example, through a full frontal fixed rigid barrier test. An example of such a test is a 56 kph (35 mph) fixed rigid barrier test. Another example of such a test is a 40 kph (25 mph) fixed rigid barrier test. Another example of such a test is a 32 kph (20 mph) fixed rigid barrier test.

Offset or asymmetric frontal crash events are considered to be crash events where the direction of the frontal impact is parallel or substantially parallel to the vehicle longitudinal axis ($X_{VEH}$) and offset to either the LH or RH side of the vehicle. The ability to discriminate an asymmetric front crash event can be evaluated and verified, for example, through a frontal offset impact with a fixed rigid barrier crash test. An example of such a test is a 40% offset rigid barrier test at 64 kph (40 mph), 56 kph (35 mph), or 40 kph (25 mph). As another example, the ability to discriminate an asymmetric front crash event can also be evaluated and verified through a frontal offset impact with a deformable barrier crash test. An example of such a test is a 40% offset deformable barrier test at 64 kph (40 mph), 56 kph (35 mph), or 40 kph (25 mph).

Oblique or angular frontal crash events are considered to be crash events where the frontal impact occurs oblique or at an angle to the vehicle longitudinal axis ($X_{VEH}$). The ability to discriminate an oblique/angular frontal crash event can be evaluated and verified, for example, through an oblique/angular impact with a rigid barrier crash test. An example of such a test is an oblique/angular rigid barrier test at an angle of 30 degrees at a speed of 40 kph (25 mph) or 32 kph (20 mph).

Small overlap frontal crash events are a sub-category of asymmetric/offset frontal crash events where the overlap is small. The ability to discriminate a small overlap front crash event can be evaluated and verified, for example, through a frontal small overlap impact with a moving deformable barrier crash test. An example of such as test is a moving deformable barrier test where the overlap is 20% and where the frontal impact is parallel or substantially parallel (e.g., 0-7 degrees) to the vehicle longitudinal axis ($X_{VEH}$).

One particular crash event that it may be desirable to discern or discriminate from other crash and non-crash events is an what is referred to as an oblique moving deformable barrier ("OMDB") crash event. The National Highway Traffic Safety Administration ("NHTSA") has developed a test procedure to test vehicle and occupant responses to this particular type of crash event. The setup for the NHTSA OMDB test procedure is illustrated in FIG. 1. According to one test procedure, the OMDB crash event can occur at 90 kph (56 mph).

Referring to FIG. 1, according to the NHTSA OMDB test procedure, a test vehicle 10 is subjected to an impact with a moving deformable barrier ("MDB") 12. The MDB 12 includes a wheeled rolling frame 14 that supports a deformable barrier 16. The deformable barrier 16 can have a configuration and construction selected to mimic structure, such as a typical or standard vehicle, with which the test vehicle 12 may collide during use. In this manner, the MDB 12 can be used to evaluate real-world vehicle-to-vehicle collisions. For example, the deformable barrier 16 can have a two-layered honeycombed plastic structure with a leading layer 16a having a stiffness of 100 psi and a second layer 16b stiffness of 245 psi. The size (length, width, depth) of the layers 16a, 16b can be configured so that the deformation exhibited by the deformable barrier 16 in response to a collision mimics that of the typical/standard vehicle.

The MDB 12 can also be configured and dimensioned commensurate with the typical/standard vehicle. For example, the MDB 12 can have standardized dimensions, such as overall length, width, height, wheel base, etc. The MDB 12 can also be weighted to a standardized total weight, such as 2486 kg (5481 pounds). The weight of the MDB 12 can be distributed to place the center-of-mass of the MDB at a predetermined location on or relative to the MDB structure.

To perform the OMDB test procedure, the test vehicle 10 remains stationary and the MDB 12 is launched at a controlled velocity to impact the test vehicle, thus simulating a crash event. The simulated crash event is highly controlled so that the MDB 12 impacts the test vehicle 10 at a specific angle (indicated at crash angle A in FIG. 1) with a specific amount of overlap (indicated at crash overlap B in FIG. 1). The velocity (indicated at crash velocity C in FIG. 1) is also highly controlled. The crash angle A is measured between the longitudinal axis of the vehicle ($X_{VEH}$) and the longitudinal axis of the MDB 12 ($X_{MDB}$). The crash overlap B is measured as the width of the vehicle, measured along the lateral axis of the vehicle ($Y_{VEH}$) that the deformable barrier 16 impacts. According to one particular OMDB test procedure, the crash angle A can be 15 degrees, the crash overlap can be 35% of the width of the test vehicle 10, and the velocity C can be 90 kph (56 mph).

The ability to discriminate the OMDB crash event from similar crash events, such as the aforementioned offset, oblique/angular, and small overlap crash events, is not trivial, since each of these crash events has characteristics that are shared with each other. It is therefore desirable to provide a safety system that includes a discrimination algorithm that not only can identify the OMDB crash event, but also discriminate this crash event from other events. The ability to provide this level of discrimination can allow the system to meet deployment specifications for safety devices controlled by the system.

Also, it may be desirable to discriminate between full frontal crash events of differing severities. For example, it may be desirable for a safety system to discriminate 56 kph fixed rigid barrier impacts, 40 kph fixed rigid barrier impacts, and 32 kph fixed rigid barrier impacts from each other. In doing so, it may be desirable to discriminate these full frontal crash events from OMDB and other types of crash events.

SUMMARY

According to one aspect, a vehicle safety system for a vehicle can include front impact sensors ("FIS"), side impact sensors ("SIS"), and central impact sensors housed in an airbag control unit ("ACU"). The front impact sensors can include a driver or left-hand sensor ("FIS-LH") and a passenger or right-hand sensor ("FIS-RH"). Similarly, The side impact sensors can include a driver or left-hand sensor ("SIS-LH") and a passenger or right-hand sensor ("SIS-RH").

In one example configuration, the front impact sensors can be single axis sensors placed in a crush-zone of the vehicle (crush zone sensors "CZS) and configured to measure acceleration in the longitudinal direction of the vehicle ($X_{VEH}$). The side impact sensors can be multi-axis sensors ("MAS") placed in a remote side location on the vehicle, such as in a B-pillar and configured to measure acceleration in the longitudinal direction of the vehicle ($X_{VEH}$) and lateral direction of the vehicle ($Y_{VEH}$). The ACU sensors can measure vehicle acceleration in both the longitudinal and lateral directions of the vehicle and can be configured as multiple single axis sensors or a single multi-axis sensor.

The safety system can detect several types of crash events for which occupant protection may be desired, such as frontal crash events, side crash events, rear crash events, asymmetric/offset crash events, angular/oblique crash events, and rollover crash events. The safety system can actuate several occupant protection devices in response to detecting these events, such as seat belt retractors, seat belt pretensioners, and airbags, such as frontal airbags (e.g., steering wheel/instrument panel mounted airbags), side airbags (seat/door mounted airbags), inflatable curtains, inflatable knee bolsters, inflatable seat belts, etc.

According to one aspect, a vehicle safety system can implement a discrimination algorithm that can discriminate an oblique moving deformable barrier crash event from a full frontal crash event, an asymmetric/offset frontal crash event, an oblique/angular crash event, and a small overlap crash events.

According to another aspect, a method for controlling an actuatable restraining device includes sensing a plurality of crash event indications in response to a crash event. The method also includes classifying the crash event in response to comparing the sensed crash event indications against one another to identify an oblique moving deformable barrier crash event. The method further includes controlling deployment timing of the actuatable restraining device in response to the classification of the crash event.

According to one aspect of the method, alone or in combination with any previous aspect, the method can include discriminating the oblique moving deformable barrier crash event from at least one of a frontal crash event, an asymmetric crash event, a small overlap crash event, and an offset deformable barrier crash event.

According to another aspect of the method, alone or in combination with any previous aspect, sensing the plurality of crash event indications can include sensing crash acceleration in the vehicle's longitudinal direction via a left-hand front impact sensor, a right-hand front impact sensor, a left-hand side impact sensor, a right-hand side impact sensor, and a central impact sensor.

According to another aspect of the method, alone or in combination with any previous aspect, classifying the crash event can include determining that the crash event indications indicate the occurrence of an asymmetric crash event on one side of the vehicle; determining whether the crash event is possibly an oblique moving deformable barrier crash event by comparing crash velocity versus displacement measured via the side impact sensor on the one side of the vehicle; and confirming that the crash event is an oblique moving deformable barrier crash event by comparing crash acceleration measured via the front impact sensor on the one side of the vehicle versus displacement measured via the central impact sensor.

According to another aspect of the method, alone or in combination with any previous aspect, determining that the crash event indications indicate the occurrence of an asymmetric crash event on one side of the vehicle can include comparing crash velocities measured via the front impact sensors; comparing crash velocities measured via the side impact sensors; and determining the occurrence of an asymmetric crash event on one side of the vehicle in response to the compared crash velocities measured via at least one of the front impact sensors and side impact sensors indicating the occurrence of an asymmetric crash event.

According to another aspect of the method, alone or in combination with any previous aspect, determining whether the crash event is possibly an oblique moving deformable barrier crash event comprises determining that the crash event can be any of an oblique moving deformable barrier crash event, a small overlap crash event, and an angular crash event.

According to another aspect of the method, alone or in combination with any previous aspect, confirming that the crash event is an oblique moving deformable barrier crash event comprises determining that the crash acceleration measured via the front impact sensor on the one side of the vehicle versus displacement measured via the central impact sensor crosses threshold indicative of an oblique moving deformable barrier crash event.

According to another aspect of the method, alone or in combination with any previous aspect, the method can also include comparing velocity versus displacement measured via the central impact sensor to determine whether the crash event exceeds a seatbelt firing threshold, and actuating an actuatable seatbelt device in response to the compared velocity versus displacement measured via the central impact sensor crossing a seatbelt misuse threshold. According to this aspect, actuating the actuatable seatbelt device can take place within as little as 10 milliseconds.

According to another aspect of the method, alone or in combination with any previous aspect, the method can include comparing velocity versus displacement measured via the central impact sensor to determine whether the crash event exceeds an airbag firing threshold, and actuating an airbag in response to the compared velocity versus displacement measured via the central impact sensor crossing an airbag misuse threshold. According to this aspect, actuating the airbag can take place within as little as 10 milliseconds.

According to another aspect of the method, alone or in combination with any previous aspect, the front impact sensors can be crush zone acceleration sensors and the side impact sensors are pillar mounted satellite acceleration sensors.

According to another aspect of the method, alone or in combination with any previous aspect, the oblique moving deformable barrier crash event can be a 90 kph oblique moving deformable barrier crash event.

According to another aspect, an apparatus for controlling an actuatable restraining device in response to a crash event includes a plurality of impact sensors for sensing a plurality of crash event indications, and a controller operatively connected to the impact sensors. The controller can be configured to receive the crash event indications, compare the crash event indications against one another to identify the crash event as being an oblique moving deformable barrier crash event, and control deployment of the actuatable restraining device in response to identifying the crash event as being an oblique moving deformable barrier crash event.

According to one aspect of the apparatus, alone or in combination with any previous aspect, the controller can discriminate the oblique moving deformable barrier crash event from at least one of a frontal crash event, an asymmetric crash event, a small overlap crash event, and an offset deformable barrier crash event.

According to another aspect of the apparatus, alone or in combination with any previous aspect, the impact sensors can be configured to sense crash acceleration in the vehicle's longitudinal direction, the impact sensors comprising a left-hand front impact sensor, a right-hand front impact sensor, a left-hand side impact sensor, a right-hand side impact sensor, and a central impact sensor.

According to another aspect of the apparatus, alone or in combination with any previous aspect, to classify the crash event, the controller can: a) determine that the crash event indications indicate the occurrence of an asymmetric crash event on one side of the vehicle; b) determine whether the crash event is possibly an oblique moving deformable barrier crash event by comparing crash velocity versus displacement measured via the side impact sensor on the one side of the vehicle; and c) confirm that the crash event is an oblique moving deformable barrier crash event by comparing crash acceleration measured via the front impact sensor on the one side of the vehicle versus displacement measured via the central impact sensor.

According to another aspect of the apparatus, alone or in combination with any previous aspect, the controller can determine that the crash event indications indicate the occurrence of an asymmetric crash event on one side of the vehicle by: a) comparing crash velocities measured via the front impact sensors; b) comparing crash velocities measured via the side impact sensors; and c) determining the occurrence of an asymmetric crash event on one side of the vehicle in response to the compared crash velocities measured via at least one of the front impact sensors and side impact sensors indicating the occurrence of an asymmetric crash event.

According to another aspect of the apparatus, alone or in combination with any previous aspect, the controller can determine whether the crash event is possibly an oblique moving deformable barrier crash event by determining that the crash event can be any of an oblique moving deformable barrier crash event, a small overlap crash event, and an angular crash event.

According to another aspect of the apparatus, alone or in combination with any previous aspect, the controller can confirm that the crash event is an oblique moving deformable barrier crash event by determining that the crash acceleration measured via the front impact sensor on the one side of the vehicle versus displacement measured via the central impact sensor crosses threshold indicative of an oblique moving deformable barrier crash event.

According to another aspect of the apparatus, alone or in combination with any previous aspect, the controller can be configured to: a) compare velocity versus displacement measured via the central impact sensor to determine whether the crash event exceeds a seatbelt firing threshold; and b) actuate an actuatable seatbelt device in response to the compared velocity versus displacement measured via the central impact sensor crossing a seatbelt misuse threshold. According to this aspect, the controller can be configured to actuate the actuatable seatbelt device within as little as 10 milliseconds.

According to another aspect of the apparatus, alone or in combination with any previous aspect, the controller can be configured to: a) compare velocity versus displacement measured via the central impact sensor to determine whether the crash event exceeds an airbag firing threshold; and b) actuate an airbag in response to the compared velocity versus displacement measured via the central impact sensor crossing an airbag misuse threshold. According to this aspect, the controller can be configured to actuate the airbag within as little as 10 milliseconds.

According to another aspect of the apparatus, alone or in combination with any previous aspect, the front impact sensors can be crush zone acceleration sensors and the side impact sensors are pillar mounted satellite acceleration sensors.

According to another aspect of the apparatus, alone or in combination with any previous aspect, the controller can discriminate a 90 kph oblique moving deformable barrier crash event.

DRAWINGS

The foregoing and other features and advantages of the invention will become apparent to one skilled in the art upon consideration of the following description of the invention and the accompanying drawings in which:

FIGS. 6A-6B are graphical representations that illustrate of vehicle event values used for event zone classifications according to another aspect of the invention;

DESCRIPTION

Figure 1:
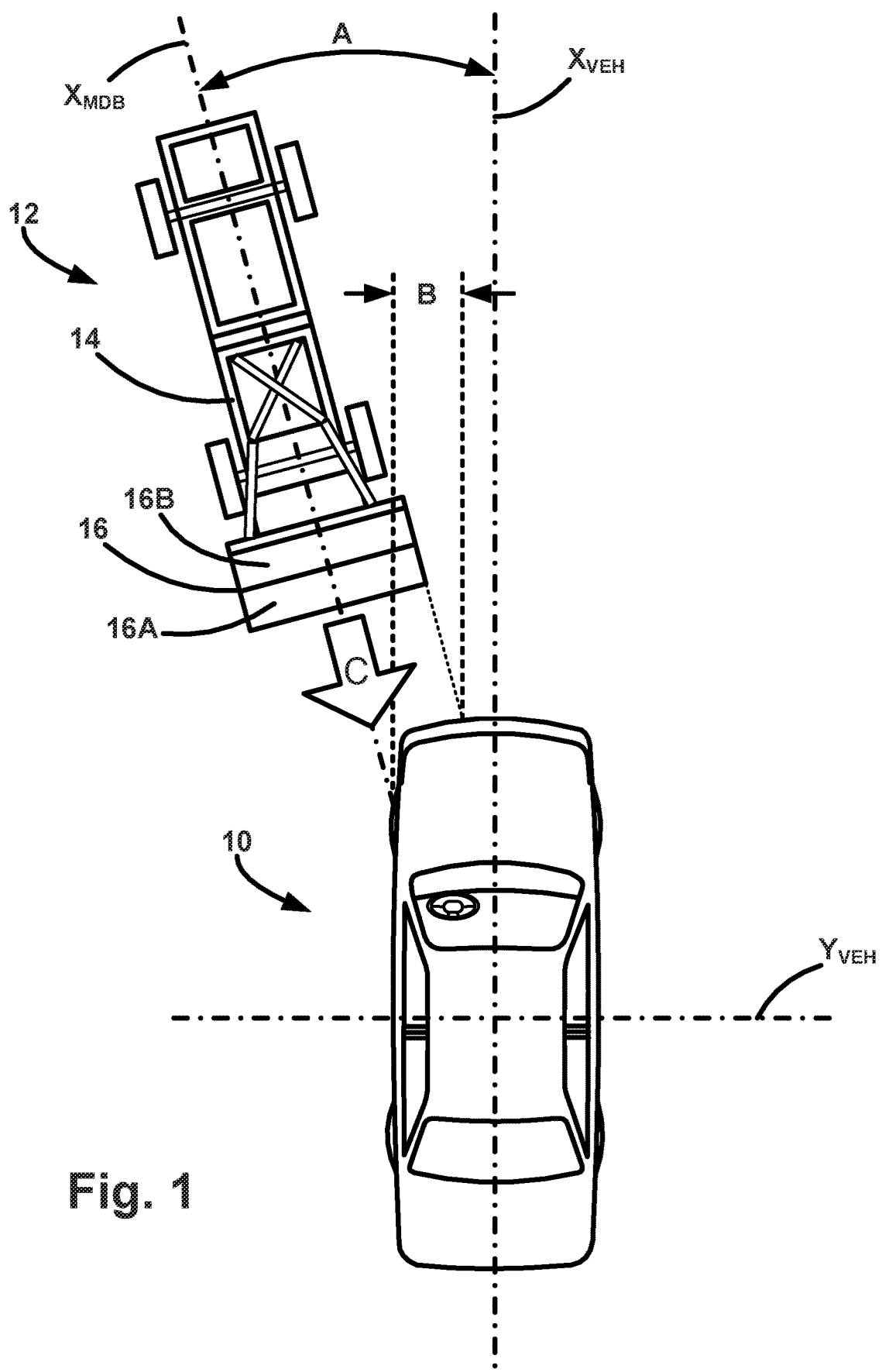
FIG. 1 is a schematic diagram illustrating a test procedure for validating the operation of a vehicle safety system, according to one aspect of the invention.
Figure 2:
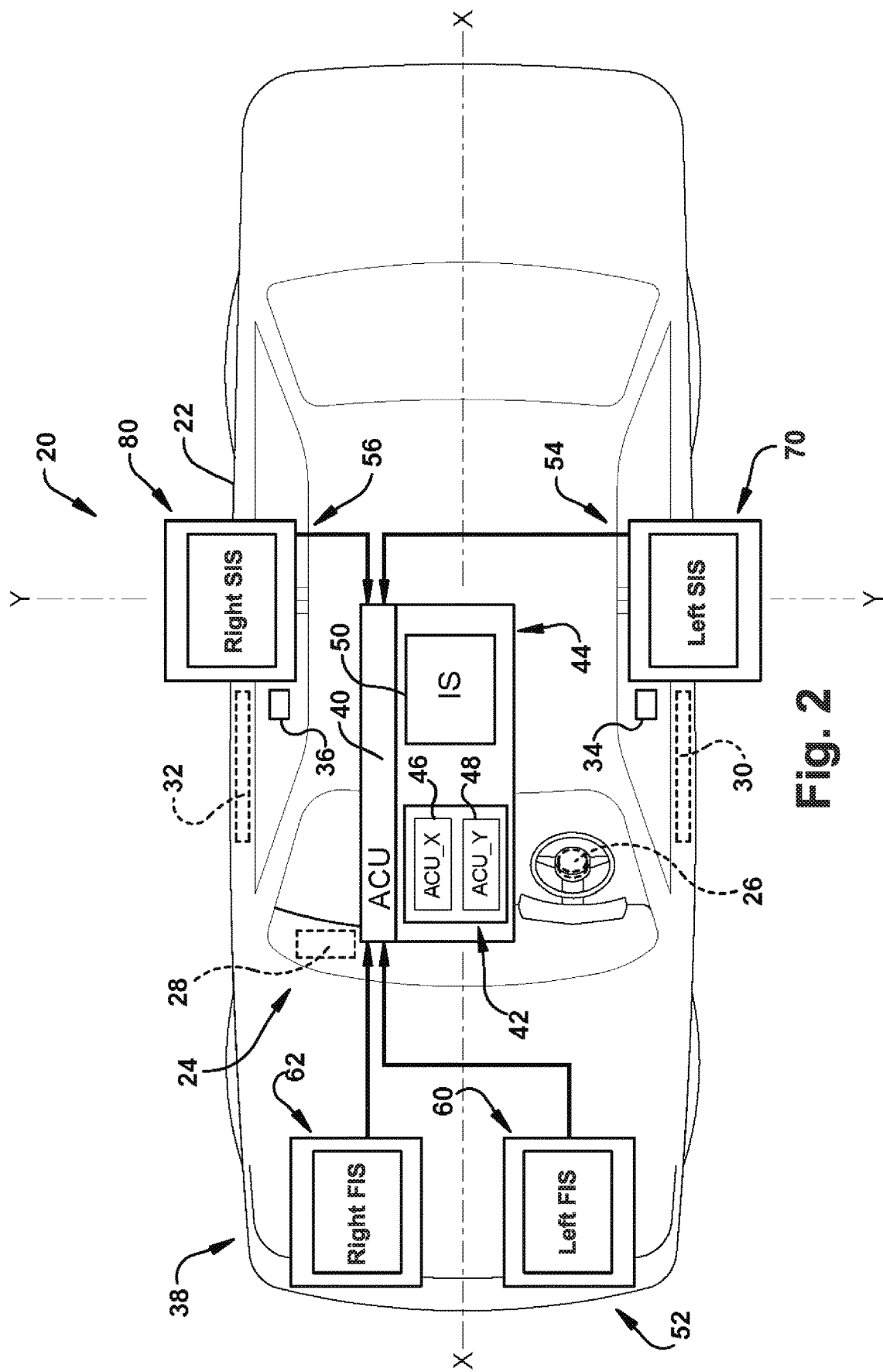
FIGS. 2 and 3 are schematic diagrams illustrating a sensor architecture that can be implemented in a vehicle safety system, according to another aspect of the invention.
Figure 3:
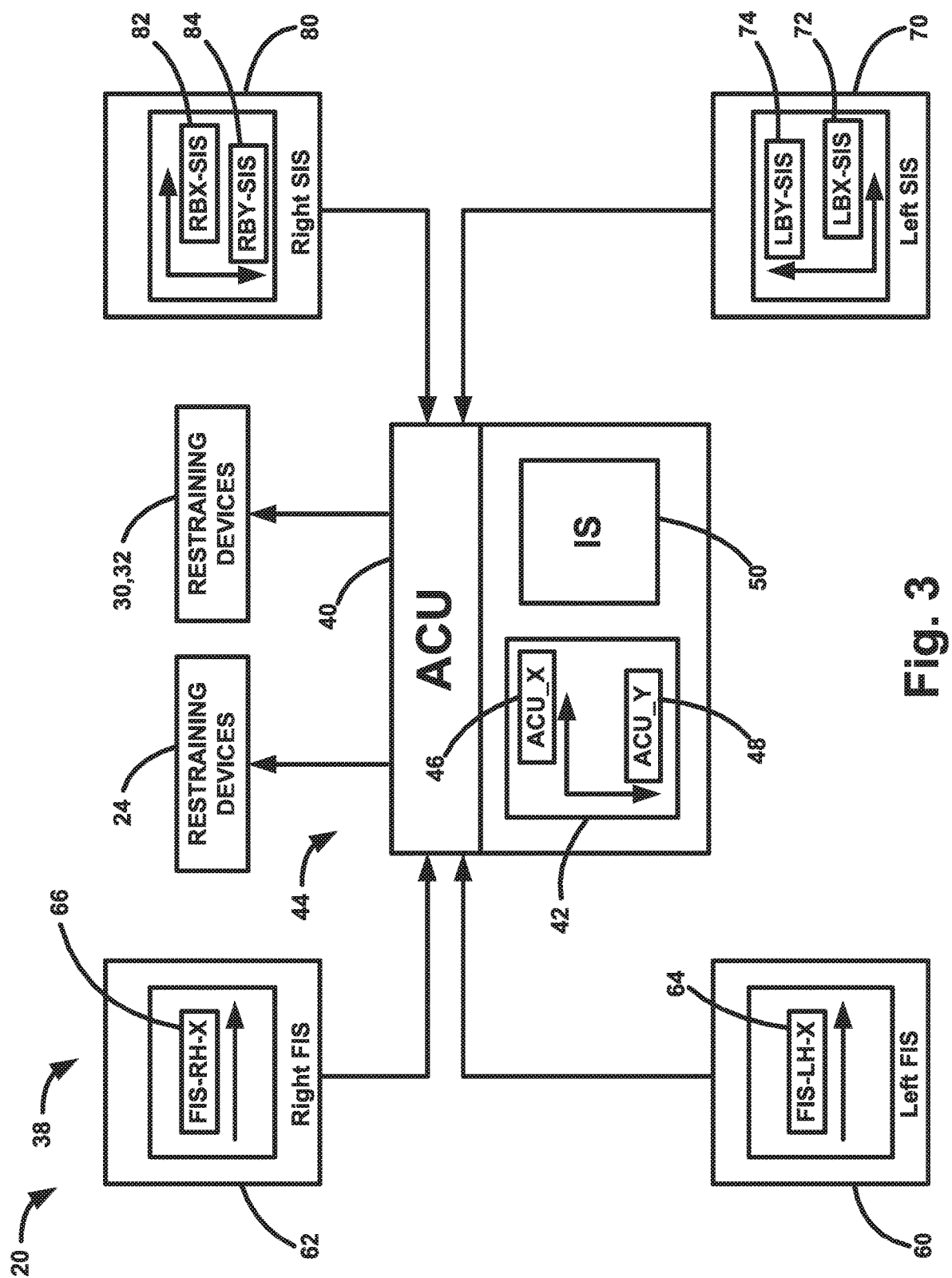

Referring to FIGS. 2 and 3, a vehicle 22 includes a vehicle safety system 20. The safety system 20 can include a plurality of actuatable vehicle occupant protection devices 24. For example, the safety system 20 can include a driver frontal protection device 26 (e.g., an inflatable restraint such as a driver frontal airbag), and a passenger frontal protection device 28 (e.g., an inflatable restraint such as a passenger frontal airbag). The safety system 20 can also include an actuatable driver restraint 34, such as a driver seat belt (e.g., a seat belt pretensioner or active load limiter), and an actuatable passenger restraint 36, such as a passenger seat belt (e.g., a seat belt pretensioner or active load limiter). The vehicle safety system 20 can further include inflatable side impact protection devices, such as a driver side impact inflatable restraint 30 (e.g., a side airbag such as a curtain airbag or a door/seat mounted side impact airbag), and a passenger side impact inflatable restraint 32 (e.g., a side airbag such as a curtain airbag or a door/seat mounted side impact airbag). The safety system 20 can include these protection devices 24 in any number or combination, and can also include other different types of protection devices not listed above, such as inflatable knee bolsters, head and neck restraints, inflatable seat belts, and rear seat inflatable restraints.

The system 20 further includes a plurality of vehicle event sensors 38 operatively connected to an airbag control unit ("ACU") 40. The protection devices 24 also are operatively connected to the ACU 40. The vehicle event sensors 38 include a central group of event sensors 42 that can be housed along with the ACU 40 in a single central module 44. The ACU 40 can have any configuration or construction that facilitates the functions described herein. For example, the ACU 40 can be a programmable microcontroller or a controller using an application specific integrated circuit ("ASIC"). The ACU 40 monitors signals from the event sensors 38 and controls the protection devices 24 in response to crash events determined from those signals.

The event sensors 38 can have a variety of measurement capabilities. For example, the event sensors 38 can be capable of measuring accelerations over a wide range, such as +/−100 g, +/−250 g, +/−240 g, or +/−480 g. The sensitivity of each event sensor 38 depends on a variety of factors. For example, the sensitivity of an event sensor 38 can depend on the location on the vehicle (e.g., front, side, central, etc.) where the sensor is mounted and the types of events (e.g., frontal impacts, side impacts, asymmetric impacts, small overlap (SOL) impacts, offset deformable barrier (ODB) impacts, oblique moving deformable barrier (OMDB) impacts, etc. The sensitivity of the event sensors 38 can also depend on the desired degree of discrimination resolution and the amount of signal clipping that is acceptable. Furthermore, different vehicle configurations or platforms can respond differently to certain types of crash events and therefore can dictate the required sensor sensitivity necessary to provide the desired discrimination functions.

The central event sensors 42 include a first crash acceleration sensor 46 having its axis of sensitivity substantially oriented to sense crash acceleration in the vehicle X-direction (i.e., parallel with the front-to-rear axis of the vehicle) and provides a crash acceleration signal designated ACU_X. The central event sensors 42 further include a second crash acceleration sensor 48 having its axis of sensitivity substantially oriented to sense crash acceleration in the vehicle Y-direction (i.e., substantially perpendicular to the front-to-rear axis of the vehicle) and provides a transverse crash acceleration signal designated ACU_Y.

The crash acceleration signals from the event sensors 46, 48 can take any of several forms. Each of the crash acceleration signals can have amplitude, frequency, pulse duration, etc., or any other electrical characteristics that vary as a function of the sensed crash acceleration. In accordance with an example embodiment, the crash acceleration signals have frequency and amplitude characteristics indicative of the sensed crash acceleration. The outputs ACU_X, ACU_Y of the sensors 46, 48 are provided to the ACU 40 for processing and evaluation.

Also, the central event sensors 42 can include a plurality of inertial sensors ("IS") 50, such as a yaw rate sensor, a low-G acceleration sensor for measuring low level acceleration levels in the X-direction, and a low-G acceleration sensor for measuring low level acceleration levels in the Y-direction. The outputs of the IS sensors 50 are also provided to the ACU 40 for processing and evaluation that can be used in the control of the restraining devices.

In addition to the central event sensors 42, the event sensors 38 further include a plurality of event sensors located in the crush-zone area 52 of the vehicle 22 and in side locations 54, 56 of the vehicle 22 such as in the vehicle B-pillars. The forwardly located sensors include a driver side and passenger side crush-zone sensors ("CZS"), also referred to as front impact sensors ("FIS"), 60, 62, respectively. These crush-zone, front impact sensors can, for example, be single axis or multi-axis sensors.

Referring to FIG. 3, a Left FIS 60 includes one or more acceleration sensors having an axis of sensitivity configured and arranged to sense crash acceleration parallel with the vehicle's X-axis, as indicated generally by a left front impact sensor 64. The signal output from the left front impact sensor 64 is designated as FIS-LH-X and is provided to the ACU 40 for processing and evaluation. A Right FIS 62 includes one or more acceleration sensors having an axis of sensitivity configured and arranged to sense crash acceleration parallel with the vehicle's X-axis, as indicated generally by a right front impact sensor 66. The signal output from the right front impact sensor 66 is designated as FIS-RH-X and is provided to the ACU 40 for processing and evaluation.

The signals FIS-LH-X and FIS-RH-X from the front impact sensors 64, 66, can have amplitude, frequency, pulse duration, etc., or any other electrical characteristics that vary as a function of the sensed crash acceleration. For example, the front impact sensor signals FIS-LH-X and FIS-RH-X can have frequency and amplitude characteristics indicative of the crash acceleration experienced at locations on the vehicle 22 where the front impact sensors 64, 66 are located.

In one example configuration, the front impact sensors 64, 66 can be mounted at or near the location of a vehicle radiator. The ACU 40 can implement a control algorithm to discriminate certain types of crash events using the front impact sensor signals FIS-LH-X and FIS-RH-X alone or in combination with other sensors, such as the centrally located event sensors 46, 48, 50.

The event sensors 38 also include side impact sensors ("SIS") mounted on the left side/driver side of the vehicle 20 and on the right side/passenger side of the vehicle. The side impact sensors can, for example, be mounted on respective driver side and passenger side B-pillars of the vehicle 20. Referring to FIGS. 2 and 3, in one example configuration, the event sensors 38 can include a driver or left SIS 70 and a passenger or right SIS 80 mounted on respective left and right vehicle B-pillars.

In one example configuration, the left SIS 70 and right SIS 80 can be multi-axis satellite ("MAS") sensors. In this MAS configuration, each of the left and right SIS 70, 80 includes acceleration sensors configured and arranged to sense crash acceleration in the X-direction and the Y-direction. The left SIS 70 includes an acceleration sensor 72 for sensing acceleration in the X-axis direction, and an acceleration sensor 74 for sensing acceleration in the Y-axis direction. The signal output from acceleration sensor 72 is designated as LBX-SIS (Left B-pillar X-axis Side Impact Sensor), and can have frequency and amplitude characteristics indicative of crash acceleration in the X-axis direction. The signal output from acceleration sensor 74 is designated as LBY-SIS (Left B-pillar Y-axis Side Impact Sensor), and can have frequency and amplitude characteristics indicative of crash acceleration in the Y-axis direction. The signals LBX-SIS and LBY-SIS are provided to the ACU 40 for processing and evaluation.

The right SIS 80 includes an acceleration sensor 82 for sensing acceleration in the X-axis direction, and an acceleration sensor 84 for sensing acceleration in the Y-axis direction. The signal output from acceleration sensor 82 is designated as RBX-SIS (Right B-pillar X-axis Side Impact Sensor), and can have frequency and amplitude characteristics indicative of crash acceleration in the X-axis direction. The signal output from acceleration sensor 84 is designated as RBY-SIS (Right B-pillar Y-axis Side Impact Sensor), and can have frequency and amplitude characteristics indicative of crash acceleration in the Y-axis direction. The signals RBX-SIS and RBY-SIS are provided to the ACU 40 for processing and evaluation.

Figure 4:
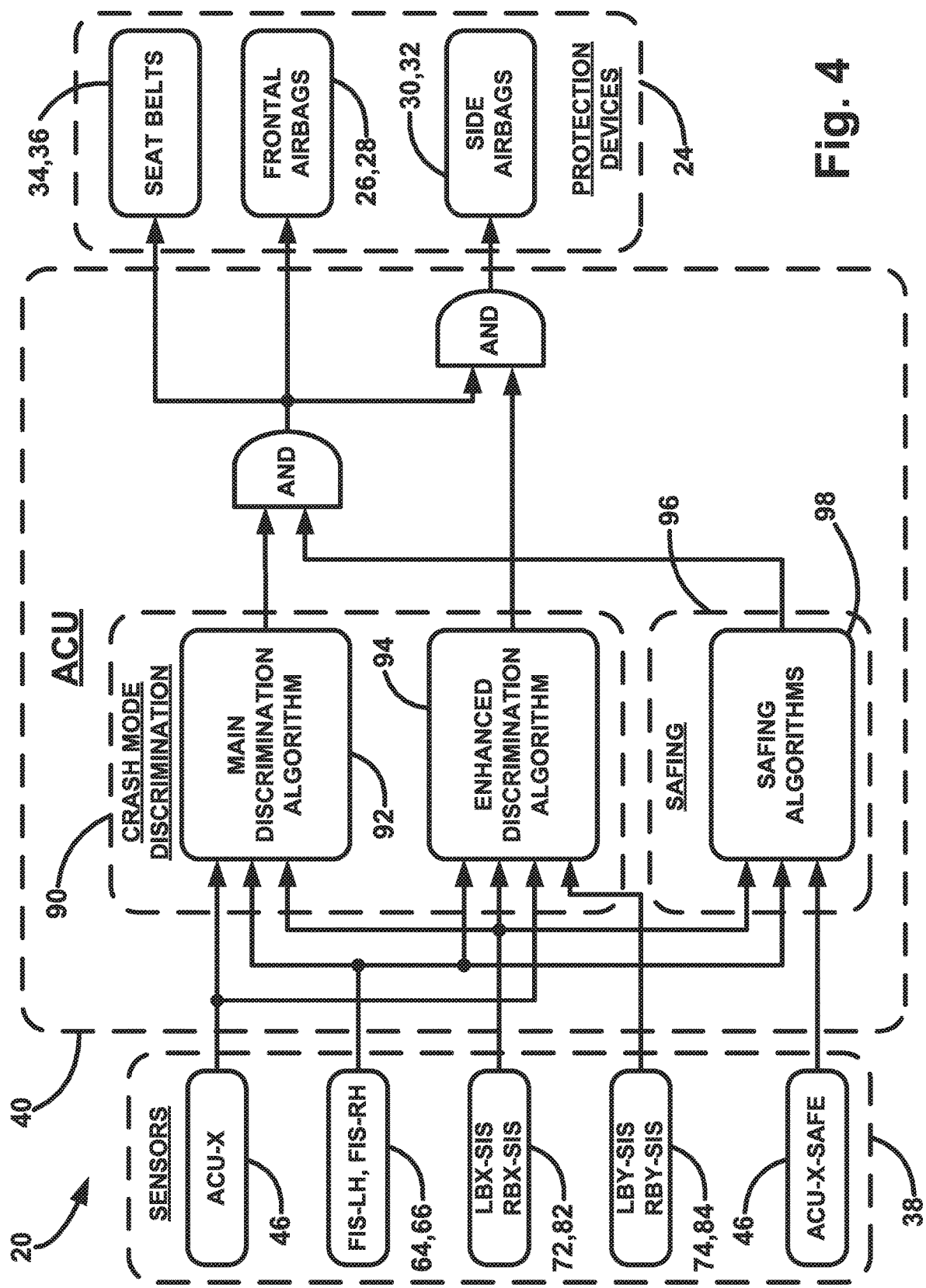
FIG. 4 is a schematic block diagram depicting the overall control architecture for processing sensor signals, according to another aspect of the invention.

FIG. 4 illustrates the overall signal processing architecture of the safety system 20. The event sensors 38 are operatively connected to the ACU 40, which is programmed to monitor the output signals from each of the event sensors 38, i.e., ACU_X 46, FIS-LH 64, FIS-RH 66, LBX-SIS 72, RBX-SIS 82, LBY-SIS 74, and RBY-SIS 84. The ACU 40 is also programmed to perform one or more control functions or algorithms to determine whether a vehicle crash event is occurring, to determine the type of crash event that is occurring, and to determine the severity of the crash event. Through performing these evaluations, the ACU 40 is programmed to determine which, if any, of several crash modes exist. This evaluation is referred to herein as "crash mode discrimination." The ACU 40 is further programmed to actuate/deploy the protection devices 24 based on the crash mode discrimination.

In the example configuration of FIG. 4, the ACU 40 is programmed to execute a crash mode discrimination algorithm 90. The crash mode discrimination algorithm 90 includes a main discrimination algorithm 92, and enhanced discrimination algorithm 94. The ACU 40 is also programmed to execute a safing function 96 that includes one or more safing algorithms 98. As shown in FIG. 4, main discrimination algorithm 92, enhanced discrimination algorithm 94, and safing algorithm 98 are provided with different combinations of the signals from the sensors 38. The main discrimination algorithm 92 is provided with ACU_X 46, FIS-LH 64, FIS-RH 66, LBX-SIS 72, and RBX-SIS 82. The enhanced discrimination algorithm 94 is provided with ACU_X 46, FIS-LH 64, FIS-RH 66, LBX-SIS 72, RBX-SIS 82, LBY-SIS 74, and RBY-SIS 84. The safing algorithm 98 is provided with ACU_X 46, FIS-LH 64, FIS-RH 66, LBX-SIS 72, and RBX-SIS 82. Each of the algorithms can use the signals provided to them in different combinations, depending on the specific determination being made.

The ACU 40 executes the main discrimination algorithm 92 to determine whether to deploy the seat belts 34, 36 (pretensioners/load limiters) and the frontal airbags 26, 28. The ACU 40 executes the enhanced discrimination algorithm 94 to determine whether to deploy the side airbags 30, 32. In the example configuration of FIG. 4, the frontal airbags 26, 28 and seat belts 34, 36 can be actuated/deployed independently of the side airbags 30, 32. Deployment of the side airbags 30, 32 in response to the enhanced discrimination algorithm 94 is conditioned on the main discrimination algorithm 92. The system 20 could, however, have an alternative configuration. For example, the frontal airbags 26, 28, seat belts 34, 36, and side airbags 30, 32 could all be actuatable independently of each other.

The ACU 40 executes the safing function 96 as a trigger for deploying the protection devices 24 as determined through the main and enhanced crash mode discrimination algorithms 92, 94. In other words, the main and enhanced discrimination algorithms 92, 94 determine which protection device(s) 24 to deploy, and the associated safing algorithm 98 determines whether to trigger deployment. The safing function 96 thus can enforce a restriction on deployment if certain conditions associated with the determined crash mode are not met.

Enhanced Discrimination

The enhanced discrimination algorithm 94 discriminates between a variety of crash mode classifications to determine the type of crash event that has taken place. The enhanced discrimination algorithm 94 can, for example, discriminate amongst a variety of crash modes in the manner set forth in U.S. patent application Ser. No. 14/437,083 (published as US 2015/0266439 A1), the disclosure of which is hereby incorporated by reference in its entirety. For example, the enhanced discrimination algorithm 94 can discriminate between a full frontal crash mode, an offset frontal crash mode, an oblique/angular crash mode, and a small overlap crash mode. According to one aspect, in addition to discriminating between the aforementioned crash event modes, the enhanced discrimination algorithm 94 can also discriminate between a 56 kph full frontal crash mode, a 40 kph full frontal crash mode, a 32 kph full frontal crash mode, and an oblique moving deformable barrier (OMDB) crash mode.

Enhanced Discrimination—Full Frontal Crash Severity

Figure 5A:
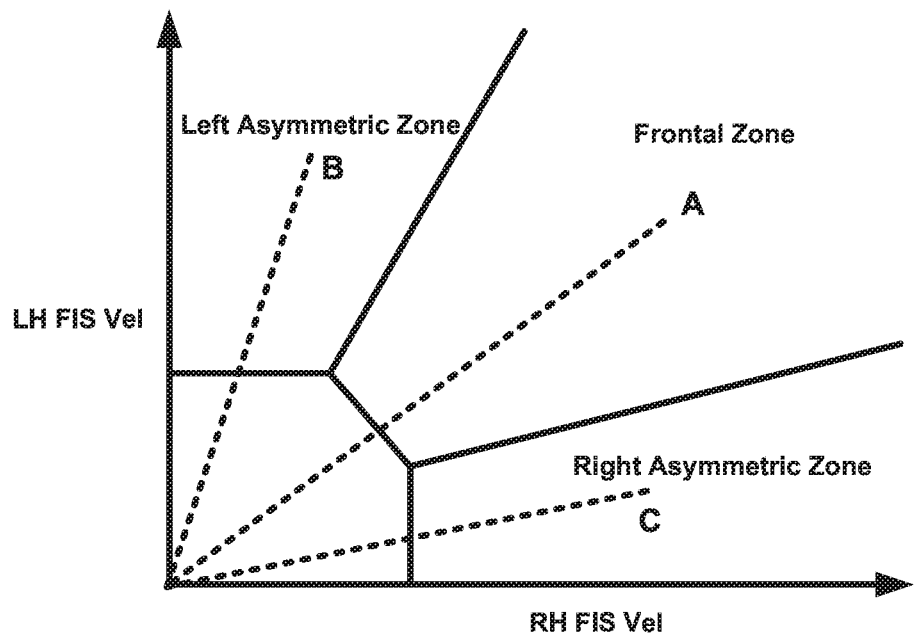
FIGS. 5A-5C are graphical representations that illustrate vehicle event values used for event zone classifications according to another aspect of the invention.
Figure 5B:
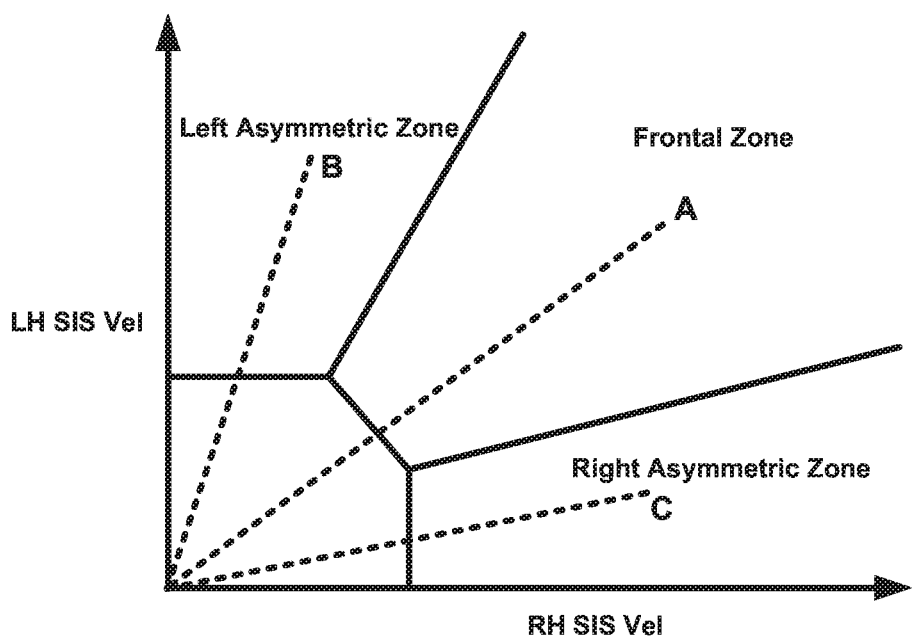

To discriminate between a 56 kph full frontal crash mode, a 40 kph full frontal crash mode, and a 32 kph full frontal crash mode, the enhanced discrimination algorithm 94 first determines that a full frontal crash event has occurred. Referring to FIGS. 5A and 5B, the enhanced discrimination algorithm 94 monitors vehicle velocity metrics (integral of accelerations) measured via the left and right front impact sensors 60, 62 and the left and right side impact sensors 70, 80.

Referring to FIG. 5A, the metrics monitored by the enhanced discrimination algorithm 94 are the velocities sensed at the left front impact sensor 60 (LH FIS Vel) and the velocity sensed at the right front impact sensor 62 (RH FIS Vel). The plot is divided into four zones or regions, namely a left asymmetric zone, a right asymmetric zone, a frontal zone, and a non-event (blank) zone. The enhanced discrimination algorithm 94 classifies a frontal crash event as having occurred when the metrics enter the frontal zone.

Referring to FIG. 5B, the metrics monitored by the enhanced discrimination algorithm 94 are the velocities sensed at the left side impact sensor 70 (LH SIS Vel) and the velocity sensed at the right side impact sensor 80 (RH SIS Vel). The plot is divided into four zones or regions, namely a left asymmetric zone, a right asymmetric zone, a frontal zone, and a non-event (blank) zone. The enhanced discrimination algorithm 94 classifies a frontal crash event as having occurred when the plot enters the frontal zone.

The dashed lines represented at A in FIGS. 5A and 5B represent the front and side impact sensor responses, respectively to a symmetric full frontal crash event. Since, however, frontal crash events are rarely completely symmetric, a full frontal crash event may not always plot in this symmetrical fashion. As a result, events that occur within a predetermined deviation from full symmetric can qualify as symmetric crash events. Similarly, events occurring outside these bounds, i.e., those represented by dashed lines B and C in FIGS. 5A and 5B, indicate asymmetric crash events. Therefore, the first step in the enhanced discrimination algorithm 94 discriminating between the 56, 40, and 30 kph full frontal crash events is determining that a full frontal crash event has occurred. Accordingly, the enhanced discrimination algorithm 94 is configured to determine the occurrence of a full frontal crash event when classifications determined via both the front impact sensors 60, 62 (FIG. 5A) and the side impact sensors 70, 80 (FIG. 5B) indicate crash metrics in the frontal zone.

Figure 5C:
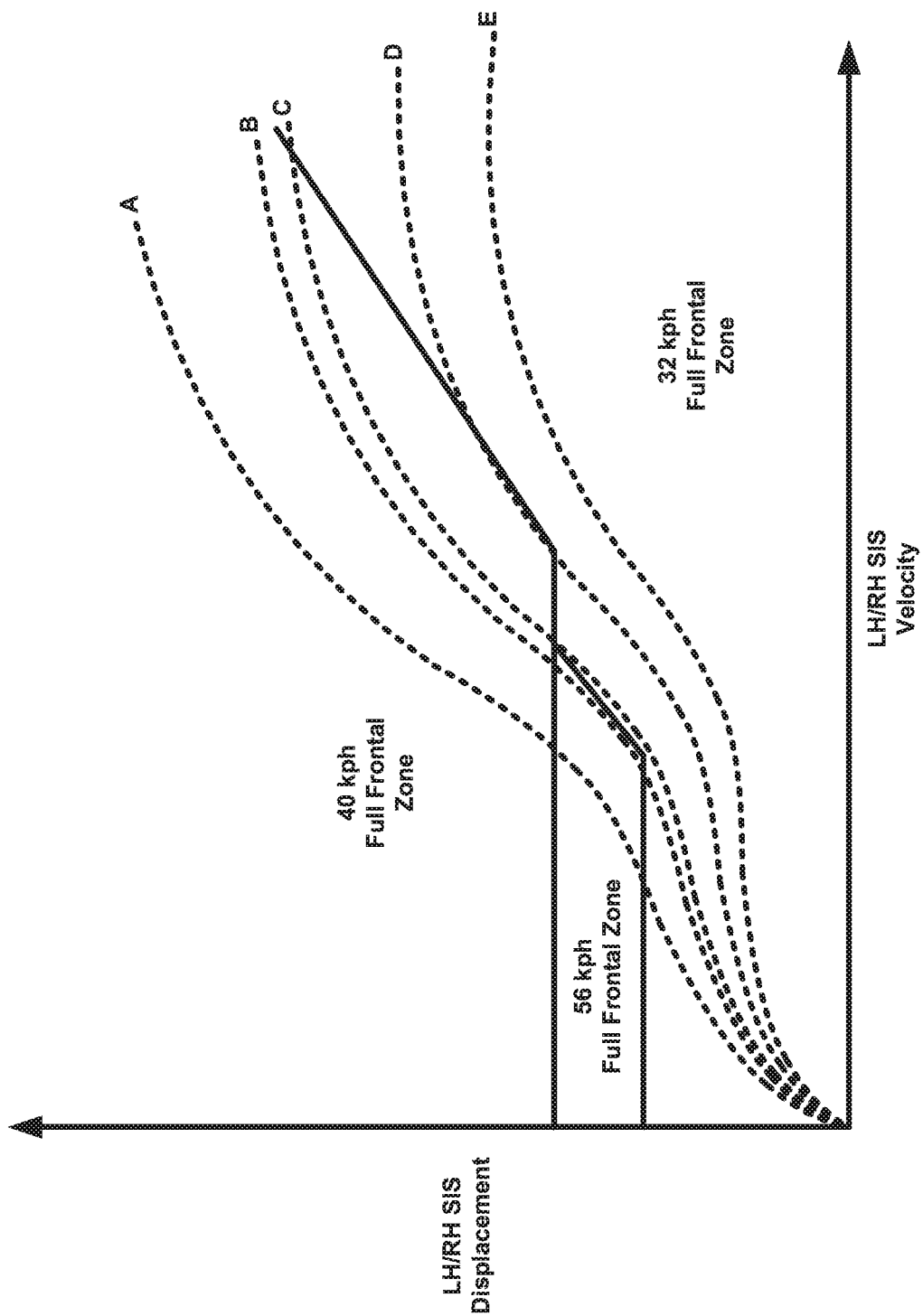

The enhanced discrimination algorithm 94 also discriminates the severity of the full frontal crash event by determining whether the full frontal crash event is a 56 kph, 40 kph, or 32 kph event. To do so, the enhanced discrimination algorithm 94 monitors both velocities (integrated acceleration) and displacements (double integrated acceleration) measured via the side impact sensors 70, 80. This is illustrated in FIG. 5C, which plots displacement versus velocity. In FIG. 5C, displacement plotted vertically and velocity horizontally. The plot illustrates values for both left and right side impact sensors (LH/RH SIS), with the understanding that the evaluation is made on a per side basis. In other words, the enhanced discrimination algorithm 94 evaluates metrics for LH SIS displacement versus velocity and metrics for RH SIS displacement versus velocity to determine the severity of the frontal crash event.

The plot of FIG. 5C is divided into three zones: a 56 kph full frontal zone, a 40 kph full frontal zone, and a 32 kph full frontal zone. The metrics are calculated from acceleration signals obtained from the side impact sensors 70, 80. The enhanced discrimination algorithm 94 classifies the severity of a frontal crash event based on the highest severity zone that the metrics enter, regardless of whether they leave that particular zone.

In a full frontal crash event, the velocity versus displacement metrics tend to display the same general shape or form, which is illustrated generally by the five example event metrics lines labeled A through E in FIG. 5C. The shape of the metrics can, of course, vary from vehicle platform to vehicle platform and from crash event to crash event, but the general shape in general holds true. The enhanced discrimination algorithm 94 can be tuned so that the full frontal zones of FIG. 5C correspond or complement the general shape or form of the metrics for the particular vehicle platform in which the system is implemented.

Viewing FIG. 5C, metric lines A and B both pass through the 56 kph full frontal zone. Therefore, enhanced discrimination algorithm 94 classifies these the crash events as being 56 kph full frontal crash events. Metric lines C and D both pass through the 40 kph full frontal zone. Therefore, enhanced discrimination algorithm 94 classifies these the crash events as being 40 kph full frontal crash events. Metric line E extends only in the 32 kph full frontal zone. Therefore, enhanced discrimination algorithm 94 classifies this crash event as being 32 kph full frontal crash event. The metric lines A-E do illustrate some approximate bounds for the full frontal severity classification performed by the enhanced discrimination algorithm 94. For example, metric line B extends in the lower bounds of the 56 kph full frontal zone, and metric lines C and D extend in the upper and lower bounds, respectively, of the 40 kph full frontal zone.

The 56 kph full frontal zone represents a threshold severity classification for the full frontal crash event. In other words, the enhanced discrimination algorithm 94 classifying the crash event as a 56 kph full frontal zone crash event means that the severity of the full frontal crash event is at least 56 kph. The enhanced discrimination algorithm 94 will classify the crash event as a 56 kph full frontal crash event any time the crash event occurs at 56 kph or greater.

Similarly, the 32 kph full frontal zone is also a threshold severity classification for the full frontal crash event. In other words, the enhanced discrimination algorithm 94 classifying the crash event as a 32 kph full frontal zone collision means that the severity of the full frontal crash event is up to 32 kph. The enhanced discrimination algorithm 94 will classify the crash event as a 32 kph full frontal crash event any time the crash event occurs at 32 kph or less.

The 40 kph full frontal zone is bounded by the 56 kph and 32 kph full frontal zones. Therefore, the 40 kph full frontal zone represents a severity range bounded by the 56 kph and 32 kph zones. The enhanced discrimination algorithm 94 will classify the crash event as a 40 kph full frontal zone crash event any time the crash event occurs at less than 56 kph and greater than 32 kph. Advantageously, the enhanced discrimination algorithm 94 can discriminate a 56 kph full frontal collision, a 40 kph full frontal collision, and a 32 kph full frontal collision with predictability, repeatability, and reliability. This can be advantageous, for example, in meeting certain standards for vehicle safety system capabilities.

Figure 5D:
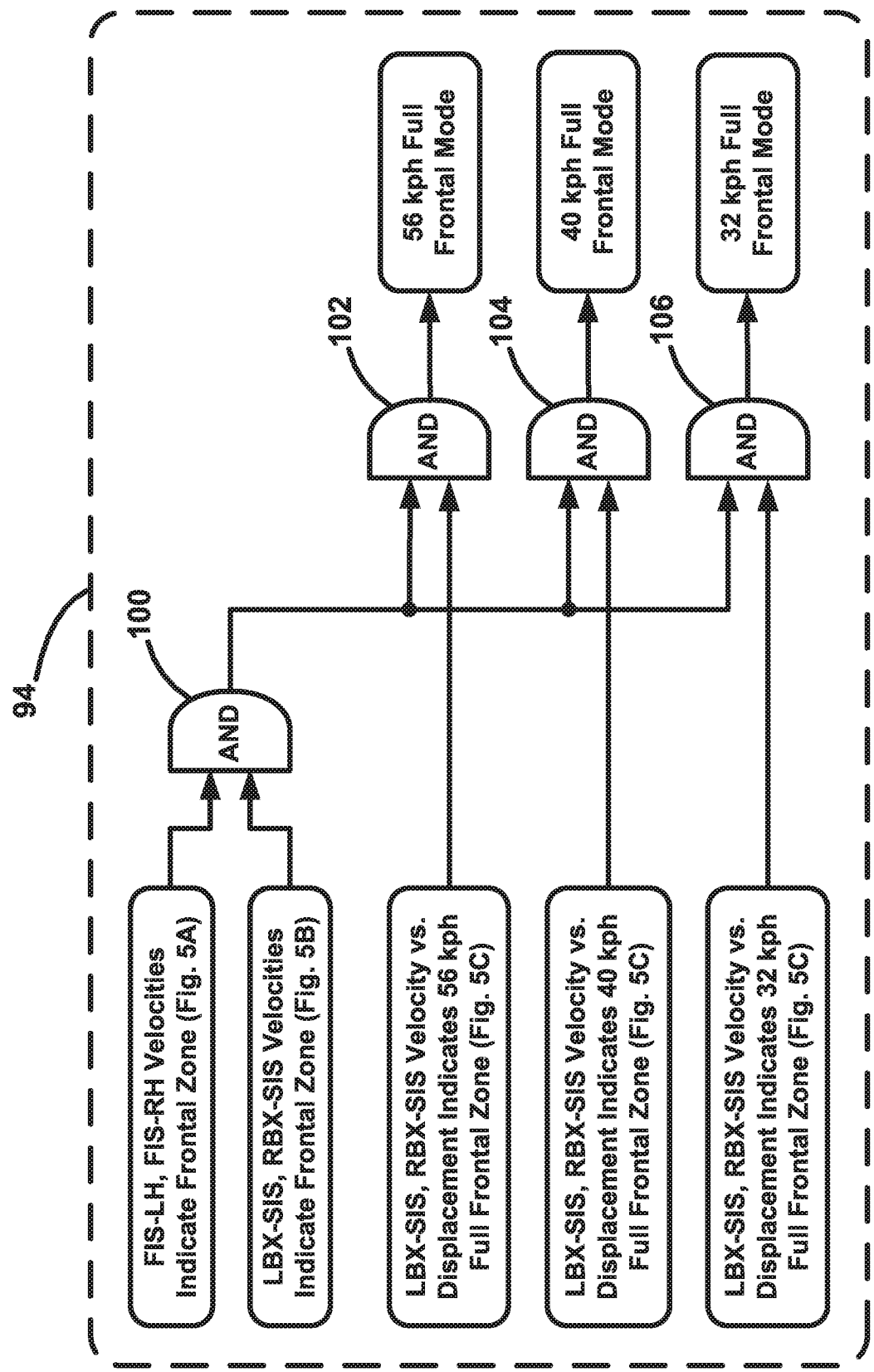
FIG. 5D is a logic diagram illustrating the classification of vehicle event modes using determinations from FIGS. 5A-5C.

In accordance with the above, the manner in which the enhanced discrimination algorithm 94 classifies full frontal crash events is illustrated in FIG. 5D. Referring to FIG. 5D, the left and right front impact sensors (FIG. 5A) and the left and right side impact sensors (FIG. 5B) are necessary for the enhanced discrimination algorithm 94 to determine any of the 32, 40, and 56 kph full frontal modes (see AND block 100). With this condition satisfied, the right and left side impact sensors velocity versus displacement indicating a 56 kph full frontal zone crash event (FIG. 5C) will cause the enhanced discrimination algorithm 94 to enter the 56 kph full frontal mode (see AND block 102). The right and left side impact sensors velocity versus displacement indicating a 40 kph full frontal zone crash event (FIG. 5C) will cause the enhanced discrimination algorithm 94 to enter the 40 kph full frontal mode (see AND block 104). The right and left side impact sensors velocity versus displacement indicating a 32 kph full frontal zone crash event (FIG. 5C) will cause the enhanced discrimination algorithm 94 to enter the 32 kph full frontal mode (see AND block 106).

Viewing the classification of FIG. 5C, it will be appreciated that the duration of the example full frontal crash events illustrated at plot lines A through E is represented along the length of each respective line. Crash events A through E begin at Time=0 at the origin of the of the classification plot and proceed along their respective lengths throughout the duration of the crash event. From this, it will be appreciated that the enhanced discrimination algorithm 94 can discriminate/classify a 56 kph full frontal crash event at a time that is early in the event.

For example, testing has shown that, through the classification of FIG. 5C, the enhanced discrimination algorithm 94 can classify a 56 kph full frontal crash event in less than 12 milliseconds in all cases. Testing has also shown that, tuning the full frontal classification of FIG. 5C for specific vehicle platforms can improve the classification time for a 56 kph full frontal crash event to be consistently and reliably less than 11 milliseconds or even less than 10 milliseconds.

Testing has also shown that, through the classification of FIG. 5C, the enhanced discrimination algorithm 94 can classify a 40 kph full frontal crash event in less than 16 milliseconds in all cases. Testing has also shown that, tuning the full frontal classification of FIG. 5C for specific vehicle platforms can improve the classification time for a 40 kph full frontal crash event to be consistently and reliably less than 15, 14, or even 13 milliseconds.

Enhanced Discrimination—OMDB

Through the classifications of FIGS. 5A and 5B, an asymmetric crash event can be identified any time one or both of the classifications classifies the crash event in an asymmetric zone (left or right). For example, in FIGS. 5A and 5B, a left asymmetric crash event is indicated generally by the dashed lines labeled B. Similarly, a right asymmetric crash event is indicated generally by the dashed lines labeled C.

The enhanced discrimination algorithm 94 is configured not only to classify an oblique moving deformable barrier (OMDB) crash event, but also to discriminate the OMDB crash event from a full frontal crash event, an offset frontal crash event, an oblique/angular crash event, and a small overlap crash event. To discriminate the OMDB crash mode from these other crash modes, the enhanced discrimination algorithm 94 implements a number of crash event classifications based on input from the sensors 38 (see FIG. 4). The enhanced discrimination algorithm 94 combines the results of these classifications in order to discriminate the OMDB crash mode from the other crash modes.

Since an OMDB crash event takes place on one side (right or left) of the vehicle, the enhanced discrimination algorithm 94 performs classifications for both sides of the vehicle. The classifications are identical regardless of the side for which the OMDB crash determination is being made. In this description, the enhanced discrimination algorithm 94 is described and illustrated as discriminating and classifying a left OMDB crash event. For simplicity and to avoid repetition, the discrimination and classification of the OMDB crash event performed by the enhanced discrimination algorithm 94 is described in detail for the left side of the vehicle only, with the understanding that the algorithm performs identically for the right side of the vehicle except, of course, that signals from the right front and side impact sensors are utilized where applicable.

Referring to FIG. 6A, the enhanced discrimination algorithm 94 implements a first OMDB classification 110 that monitors metrics measured via the left side impact sensor 70. More specifically, in FIG. 6A, the first OMDB classification 110 monitors the velocity (LH SIS Vel) and displacement (LH SIS Disp) sensed at the left side impact sensor 70. The classification of FIG. 6A is divided into zones or regions by first and second level thresholds. The zones/regions include a Left SOL/OMDB/Angular Zone defined by the first level threshold. The zones/regions also include a Left Angular/ODB Zone and a Left Angular Zone defined by the second level threshold. A small overlap (SOL) Zone is defined by an SOL threshold. The Left SOL/OMDB/Angular Zone is indicative of the occurrence of one of the following events: a small overlap (SOL) crash event, an OMDB crash event, and an angular crash event. The Left Angular/ODB Zone is indicative of the occurrence of either a left angular crash event or an offset deformable barrier (ODB) crash event.

The dashed line in FIG. 6A labeled "OMDB Event A" represents a LH velocity versus displacement metric characteristic of an example response of the left side impact sensor to a first type of OMDB crash event. In FIG. 6A, the OMDB Event A line enters the Left SOL/OMDB/Angular Zone of the first level threshold, which causes the enhanced discrimination algorithm 94 to record the first classification 110 as indicating one of a left SOL crash event, a left OMDB crash event, and a left angular crash event. Through the OMDB Event A line in the first OMDB classification 110, the enhanced discrimination algorithm 94 can determine only that one of these events has taken place. Identification that the actual event that has taken place requires further mode classification. This further classification comes in part from the second level threshold, when the OMDB Event A line enters the Left Angular/ODB Zone. The OMDB Event A line entering both the Left SOL/OMDB/Angular Zone and the Left Angular/ODB Zone results in the event being identified as having the characteristics of an OMDB event.

Similarly, the dashed line in FIG. 6A labeled "OMDB Event B" represents a LH velocity versus displacement metric characteristic of an example response of the left side impact sensor to a first type of OMDB crash event. In FIG. 6A, the OMDB Event B line enters the Left SOL/OMDB/Angular Zone of the first level threshold, which causes the enhanced discrimination algorithm 94 to record the first classification 110 as indicating one of a left SOL crash event, a left OMDB crash event, and a left angular crash event. Again, through the OMDB Event B line in the first OMDB classification 110, the enhanced discrimination algorithm 94 can determine only that one of these events has taken place. Identification that the actual event that has taken place requires further mode classification. This further classification comes in part from the second level threshold, when the OMDB Event B line enters the Left Angular Zone. The OMDB Event B line entering both the Left SOL/OMDB/Angular Zone and the Left Angular Zone results in the event being identified as having the characteristics of an OMDB event.

The dashed line in FIG. 6A labeled "SOL Event" represents an example response of the left side impact sensor to an SOL crash event. In FIG. 6A, the SOL Event line entering the SOL Zone at any time causes the enhanced discrimination algorithm 94 to record the first classification 110 as indicating a SOL crash event. Through the lower dashed line in the first OMDB classification 110, the enhanced discrimination algorithm 94 can discriminate a SOL crash event from the other events, including an OMDB crash event.

Referring to FIG. 6B, the enhanced discrimination algorithm 94 implements a second OMDB classification 112 that monitors metrics measured via the left front impact sensor 60 and the ACU 40. More specifically, in FIG. 6B, the second OMDB classification 112 monitors the left front impact sensor acceleration (FIS LH×AMA) and the ACU relative displacement in the longitudinal direction (ACU× Rel_Disp). The classification of FIG. 6B includes an OMDB severity threshold zone that classifies a crash event as an OMDB in response to determining high acceleration at the front of the vehicle in combination with comparatively little initial displacement at the ACU.

The dashed line in FIG. 6B labeled "OMDB Event" represents an example response of the front impact sensor 60 and the acceleration sensor 42 of the ACU 40 to an OMDB crash event that is similar or identical to the OMDB Event A or B shown in FIG. 6A. In FIG. 6B, the dashed line entering the OMDB Severity Threshold at any time causes the enhanced discrimination algorithm 94 to determine the second classification 112 as indicating the crash event being characteristic of an OMDB crash event.

Figure 6C:
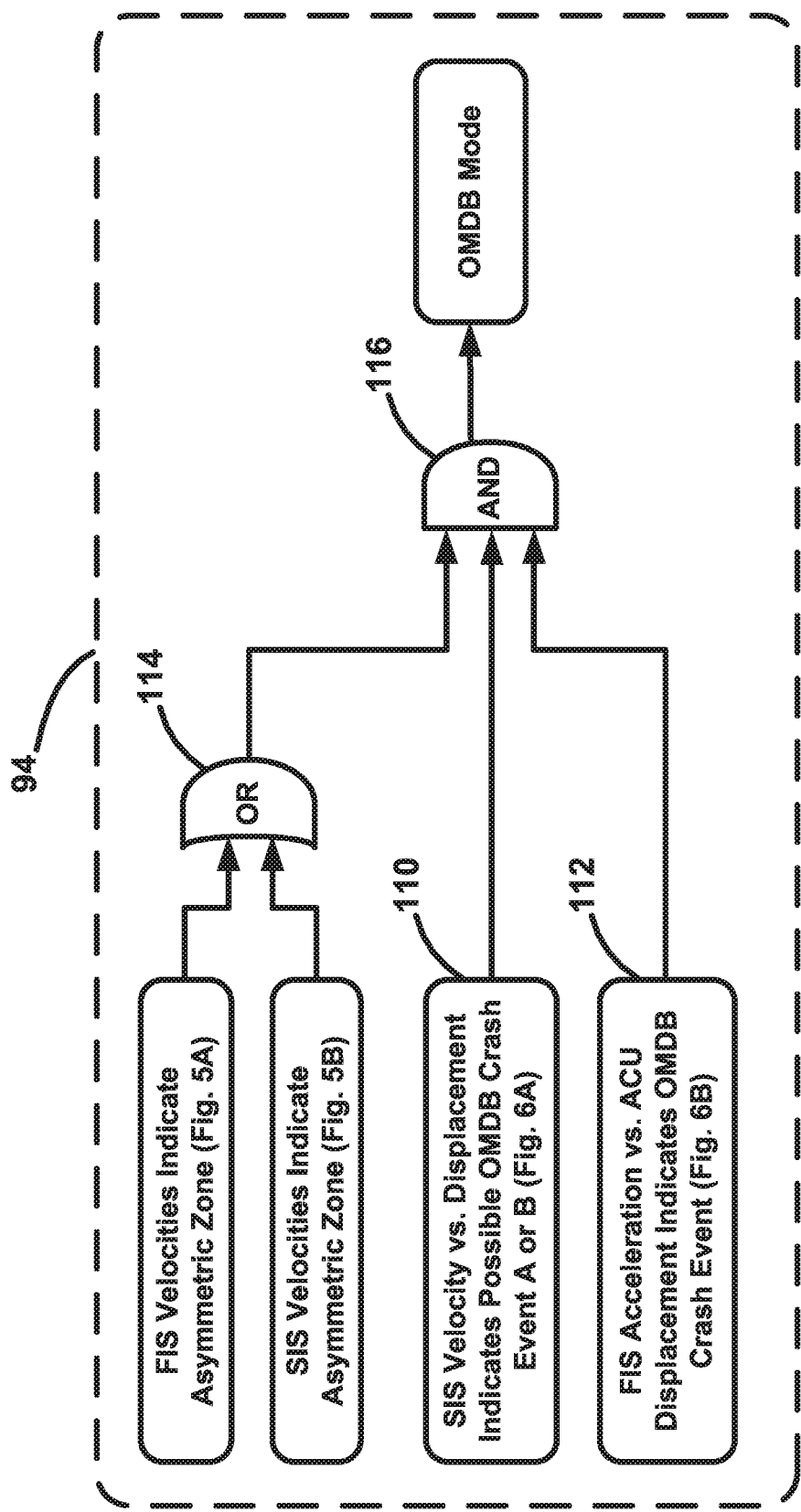
FIG. 6C is a logic diagram that illustrates the classification of vehicle event modes using determinations from FIGS. 6A-6B.

In accordance with the above, the manner in which the enhanced discrimination algorithm 94 classifies OMDB crash events is illustrated in FIG. 6C. Referring to FIG. 6C, the left and right front impact sensors (FIG. 5A) and the left and right side impact sensors (FIG. 5B) are necessary for the enhanced discrimination algorithm 94 to determine whether an asymmetric crash event has taken place (see OR block 114). With this condition satisfied, i.e., with either the FIS or SIS velocities indicating an asymmetric crash event, the first and second OMDB classifications 110, 112 can determine whether the asymmetric event is, in fact, an OMDB crash event. If the first OMDB classification 110 indicates a possible OMDB crash event (i.e., OMDB Crash Event A or B (FIG. 6A) has occurred), and the second OMDB classification verifies the OMDB crash event (i.e., displacement indicates an OMDB crash event (FIG. 6B) has occurred), the enhanced discrimination algorithm 94 will enter the OMDB crash event mode (see AND block 116).

Viewing the classifications of FIGS. 6A and 6B, it will be appreciated that the fact that the side impact sensor provides a rapid, high-magnitude response to the OMDB crash event in terms of both velocity and displacement, so it is a good gauge for determining the possibility of the SOL, OMDB, and angular crash events. The FIS provides a rapid, high-magnitude response to the OMDB crash event in terms of acceleration, which is expected since it is physically located in the impact zone for the OMDB crash event. The ACU, however, being remote from the impact zone and centrally located in the vehicle, shows a somewhat delayed response in terms of longitudinal displacement. The second OMDB classification 112 thus takes advantage of this unique combination of responses from these particular sensors in the response to a particular crash event, i.e., the OMDB crash event.

In FIGS. 6A and 6B, time is represented along the length of the dashed lines. With this in mind, it can be seen that, advantageously, the second OMDB classification 112 not only makes it possible to discriminate an OMDB crash event from other asymmetric crash events, it can do so in a surprisingly quick response time. The second OMDB classification 112 identifies the possibility of an OMDB event early in the event (see FIG. 6A) and also verifies the occurrence of the OMDB event early in the event (see FIG. 6B).

Testing has shown that the enhanced discrimination algorithm 94 implementing the OMDB event classification described herein with reference to FIGS. 5A, 5B, and 6A-6C can classify an OMDB crash event accurately, consistently, and reliably in less than 12 milliseconds in all cases. Testing has also shown that, tuning the OMDB event classification for specific vehicle platforms can improve the classification time for an OMDB crash event to be consistently and reliably less than 11 milliseconds or even about 10 milliseconds.

Additionally, for some platforms, it was found that +/−240 g sensitivity in the FIS sensors 60, 62 and/or the SIS sensors 70, 80 resulted in clipping that made it difficult in some cases to provide separation in the second OMDB classification 112 adequate to discriminate the OMDB crash event from other events, such as an oblique crash event. In these instances, it was found that increasing the sensors to +/−480 g resolution improved the separation to the degree that resulted in the desired consistency, reliability, and accuracy of the enhanced discrimination algorithm's 94 ability to detect Firing Paths The ACU 40, based on the specific mode determined via the main discrimination algorithm 92 and enhanced discrimination algorithm 94, determines seat belt and airbag deployment for that specific mode. The ACU 40 also determines whether the safing algorithm 98 associated with the determined mode is satisfied. If the safing algorithm 98 is satisfied, the ACU 40, being operatively connected to the protection devices 24, actuates the seat belts 34, 36 based on the determined seat belt deployment mode, and actuates the airbags 26, 28, 30, 32 based on the determined airbag deployment mode. Again, this is illustrated in FIG. 4, which shows that once the crash mode discrimination algorithm 90 classifies an event as being one or more crash mode events, actuation of the protection devices 24 can be triggered when the associated safing algorithms 98 are satisfied.

Figure 7:
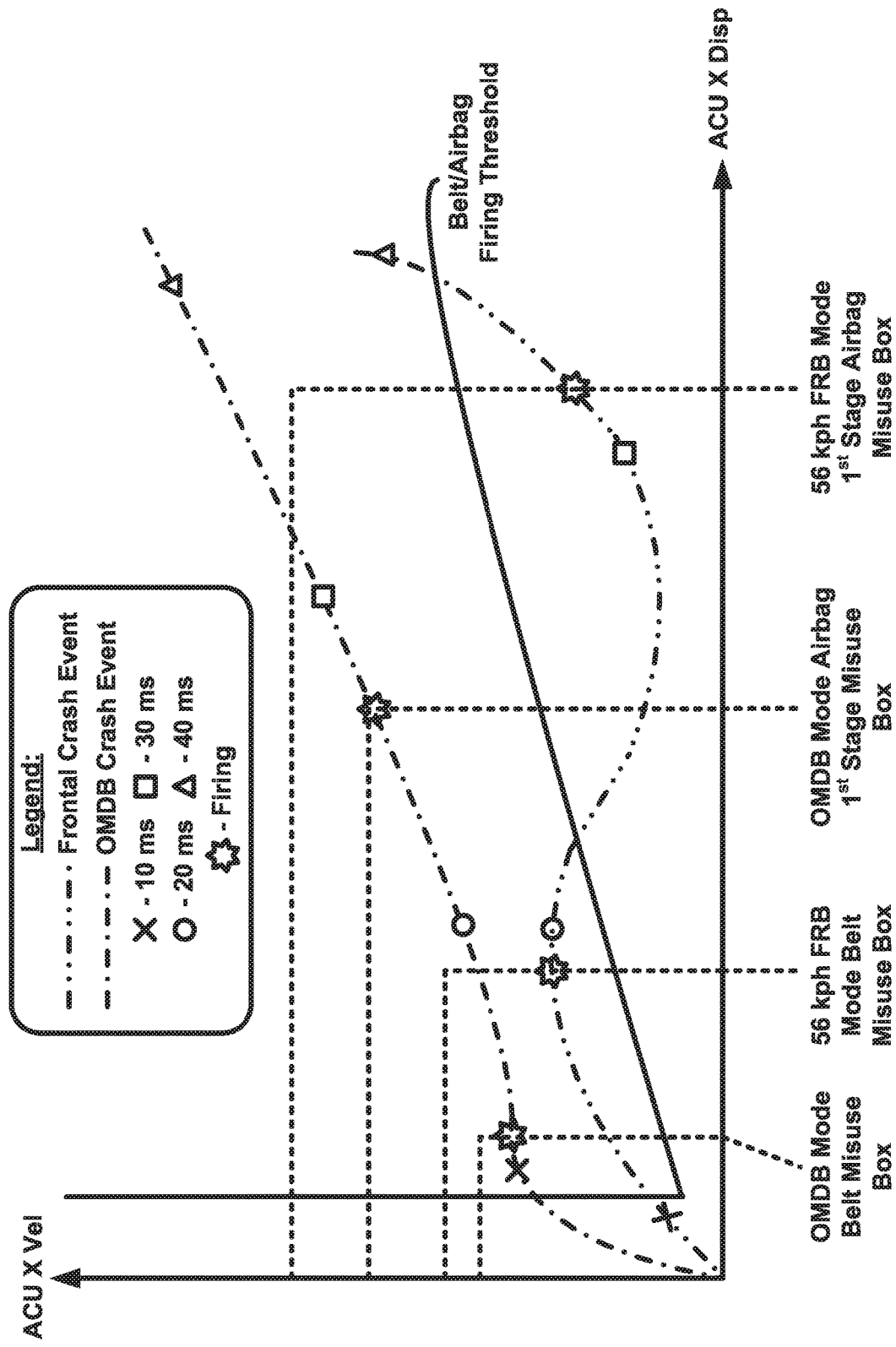
FIG. 7 is a graphical representation that illustrate firing timing for different determined vehicle event modes.

The ACU 40 is configured and programmed to monitor the sensors 38 and iterate the discrimination algorithms 92, 94 and safing algorithms 98 on a continual basis during vehicle operation. The ACU 40 is configured and programmed to permit multiple firing paths for actuating the protection devices 24. These multiple firing paths are implemented through the main discrimination algorithm 92, the enhanced discrimination algorithm 94, and the safing algorithms 98. FIG. 7 illustrates firing path examples that can be implemented in the ACU 40.

FIG. 7 illustrates by way of example how safing algorithms can be implemented in order to determine the firing path for the seatbelts and frontal airbags in response to a 56 kph frontal crash event (56 kph FRB) and in response to an OMDB event. FIG. 7 charts ACU×Velocity versus ACU× Displacement to determine when either event crosses the Belt/Airbag firing threshold. Once an event crosses this threshold and reaches the boundary of its respective belt or airbag misuse box, firing of the safety device associated with that misuse box is triggered. FIG. 7 illustrates crash events that have already been discriminated by the enhanced discrimination algorithm 94. FIG. 7 illustrates firing paths for an OMDB mode crash event and a 56 kph FRB mode crash event determined by the enhanced discrimination algorithm 94.

In FIG. 7, each crash event line includes indicia to indicate timing intervals at 10, 20, 30, and 40 milliseconds. Thus, viewing the OMDB crash event line, it can be seen that the OMDB event crosses the firing threshold at about 8 ms and shortly thereafter, at about 12 ms, crosses the OMDB Mode Belt Misuse Box, at which time the seatbelt firing, i.e., actuation of the seatbelt, is triggered. Continuing on in time, the OMDB crash event line crosses the OMDB Mode Airbag $1^{st}$ Stage Misuse Box at about 27 ms, at which time the $1^{st}$ stage airbag firing, i.e., actuation of the 1st stage airbag, is triggered.

Similarly, viewing the 56 kph FRB crash event line, it can be seen that the 56 kph FRB event crosses the firing threshold at about 8 ms and thereafter, at about 18 ms, crosses the 56 kph FRB Mode Belt Misuse Box, at which time the seatbelt firing is triggered. Continuing on in time, the 56 kph FRB crash event line crosses the 56 kph FRB Mode Airbag $1^{st}$ Stage Misuse Box at about 33 ms, at which time the $1^{st}$ stage airbag firing, i.e., actuation of the 1st stage airbag, is triggered.

There are several things to note regarding the example firing paths illustrated in FIG. 7. First, since the enhanced discrimination algorithm 94 discriminates between the different types of crash events, the inclusion of both the FRB and OMDB firing paths in FIG. 7 is for purposes of comparison and to illustrate that the system not only discriminates between the different crash events, but also controls actuation timing in response to the event classification. Additionally, from FIG. 7, it can be seen that, as long as the firing threshold is crossed, the timing of the firing path is limited only by the time it takes for the enhanced discrimination algorithm 94 to discriminate the event. Accordingly, the firing path for any of the protection devices can be specifically tailored by adjusting the appropriate misuse boxes to any time after the discrimination is completed.

For example, as described above, based on certain specifics such as the vehicle platform and the type, resolution, and placement of the crash sensors, the enhanced discrimination algorithm 94 can discriminate the OMDB mode in 10-12 milliseconds with accuracy, repeatability, and reliability. Accordingly, the OMDB misuse boxes for both belt and airbag could be adjusted to anytime after discrimination takes place. For instance, the OMDB mode belt and air bag misuse boxes could be configured so that both the seatbelt and the airbag fire at the same time, such as at 12 ms.

Similarly, as described above, based on certain specifics such as the vehicle platform and the type, resolution, and placement of the crash sensors, the enhanced discrimination algorithm 94 can discriminate the 56 kph FRB mode in 10-12 milliseconds with accuracy, repeatability, and reliability. Accordingly, the 56 kph FRB misuse boxes for both belt and airbag could be adjusted to anytime after discrimination takes place. For instance, the 56 kph FRB mode belt and air bag misuse boxes could be configured so that the seatbelt and the airbag fire sooner than that shown in FIG. 7, such as at 15 and 30 ms, respectively.

FIG. 7 illustrates just two examples of firing paths (56 kph FRB and OMDB) that can be implemented by the vehicle safety system 20. Those skilled in the art will appreciate that firing paths can be implemented in a similar manner for different types of vehicle crash events, such as 32 and 40 kph FRB crash events, ODB crash events, SOL crash events, angular/oblique crash events, and asymmetric/offset crash events.

The vehicle safety system 20 can help protect the vehicle occupant by combining the ability tailor the enhanced discrimination algorithm to discriminate the various crash events both quickly and in a platform specific manner, with the ability of the firing path algorithm to tailor the firing timing of the actuatable protection devices.

From the above description of the invention, those skilled in the art will perceive improvements, changes and modi- Having described the invention, the following is claimed:

1. A method for controlling an actuatable restraining device comprising:
   sensing a plurality of crash event indications;
   classifying a crash event in response to comparing the sensed crash event indications against one another to identify an oblique moving deformable barrier crash event, the oblique moving deformable barrier crash event having crash event indications consistent with the National Highway Traffic Safety Administration's oblique moving deformable barrier test procedure; and
   controlling deployment timing of the actuatable restraining device in response to the classification of the crash event.

2. The method recited in claim 1, further comprising discriminating the oblique moving deformable barrier crash event from at least one of a frontal crash event, an asymmetric crash event, a small overlap crash event, and an offset deformable barrier crash event.

3. The method recited in claim 2, wherein the front impact sensors are crush zone acceleration sensors and the side impact sensors are pillar mounted satellite acceleration sensors.

4. The method recited in claim 1, wherein sensing the plurality of crash event indications includes sensing crash acceleration in a vehicle's longitudinal direction via a left-hand front impact sensor, a right-hand front impact sensor, a left-hand side impact sensor, a right-hand side impact sensor, and a central impact sensor.

5. The method recited in claim 4, wherein classifying the crash event comprises:
   determining that the crash event indications indicate an occurrence of an asymmetric crash event on one side of the vehicle;
   determining whether the crash event is possibly an oblique moving deformable barrier crash event by comparing a sensed crash velocity versus a sensed displacement measured via the side impact sensor on the one side of the vehicle; and
   confirming that the crash event is an oblique moving deformable barrier crash event by comparing crash acceleration measured via the front impact sensor on the one side of the vehicle versus displacement measured via the central impact sensor.

6. The method recited in claim 5, wherein determining that the crash event indications indicate the occurrence of the asymmetric crash event on the one side of the vehicle comprises:
   comparing crash velocities measured via the left-hand and right-hand front impact sensors;
   comparing crash velocities measured via the left-hand and right-hand side impact sensors; and
   determining the occurrence of the asymmetric crash event on the one side of the vehicle in response to the compared crash velocities measured via at least one of the front impact sensors and side impact sensors indicating the occurrence of the asymmetric crash event.

7. The method recited in claim 5, wherein determining whether the crash event is possibly an oblique moving deformable barrier crash event comprises determining that the crash event can be any of an oblique moving deformable barrier crash event, a small overlap crash event, and an angular crash event.

8. The method recited in claim 5, wherein confirming that the crash event is the oblique moving deformable barrier crash event comprises determining that the crash acceleration measured via the front impact sensor on the one side of the vehicle versus displacement measured via the central impact sensor crosses a threshold indicative of the oblique moving deformable barrier crash event.

9. The method recited in claim 1, further comprising:
   comparing a velocity of the central impact sensor versus a displacement of the central impact sensor, each measured via the central impact sensor to determine whether the crash event exceeds a seatbelt firing threshold; and
   actuating the actuatable restraining device in response to the compared velocity versus displacement measured via the central impact sensor crossing a seatbelt misuse threshold, the actuatable restraining device being a seatbelt.

10. The method recited in claim 9, wherein actuating the actuatable seatbelt device takes place within 10 milliseconds.

11. The method recited in claim 1, further comprising:
    comparing a velocity of the central impact sensor versus a displacement of the central impact sensor, each measured via the central impact sensor to determine whether the crash event exceeds an airbag firing threshold; and
    actuating the actuatable restraining device in response to the compared velocity versus displacement measured via the central impact sensor crossing an airbag firing threshold, the actuatable restraining device being an airbag.

12. The method recited in claim 11, wherein actuating the airbag takes place within 10 milliseconds.

13. The method recited in claim 1, wherein the oblique moving deformable barrier crash event comprises a 90 kilometer per hour oblique moving deformable barrier crash event.

14. An apparatus for controlling an actuatable restraining device in response to a crash event, comprising:
    a plurality of impact sensors for sensing a plurality of crash event indications; and
    a controller operatively connected to the impact sensors and configured to receive the crash event indications, compare the crash event indications against one another to identify the crash event as being an oblique moving deformable barrier crash event, and control deployment of the actuatable restraining device in response to identifying the crash event as being an oblique moving deformable barrier crash event, the oblique moving deformable barrier crash event having crash event indications consistent with the National Highway Traffic Safety Administration's oblique moving deformable barrier test procedure.

15. The apparatus recited in claim 14, wherein the controller discriminates the oblique moving deformable barrier crash event from at least one of a frontal crash event, an asymmetric crash event, a small overlap crash event, and an offset deformable barrier crash event.

16. The apparatus recited in claim 14, wherein the impact sensors are configured to sense crash acceleration in the vehicle's longitudinal direction, the impact sensors comprising a left-hand front impact sensor, a right-hand front impact sensor, a left-hand side impact sensor, a right-hand side impact sensor, and a central impact sensor.

17. The apparatus recited in claim 14, wherein, to classify the crash event, the controller:

determines that the crash event indications indicate the occurrence of an asymmetric crash event on one side of the vehicle;

determines whether the crash event is possibly an oblique moving deformable barrier crash event by comparing crash velocity versus displacement measured via the side impact sensor on the one side of the vehicle; and confirms that the crash event is an oblique moving deformable barrier crash event by comparing crash acceleration measured via the front impact sensor on the one side of the vehicle versus displacement measured via the central impact sensor.

18. The apparatus recited in claim 17, wherein the controller determines that the crash event indications indicate the occurrence of an asymmetric crash event on one side of the vehicle by:

comparing crash velocities measured via the front impact sensors;

comparing crash velocities measured via the side impact sensors; and determining the occurrence of an asymmetric crash event on one side of the vehicle in response to the compared crash velocities measured via at least one of the front impact sensors and side impact sensors indicating the occurrence of an asymmetric crash event.

19. The apparatus recited in claim 17, wherein the controller determines whether the crash event is possibly an oblique moving deformable barrier crash event by determining that the crash event can be any of an oblique moving deformable barrier crash event, a small overlap crash event, and an angular crash event.

20. The apparatus recited in claim 17, wherein the controller confirms that the crash event is an oblique moving deformable barrier crash event by determining that the crash acceleration measured via the front impact sensor on the one side of the vehicle versus displacement measured via the central impact sensor crosses threshold indicative of an oblique moving deformable barrier crash event.

21. The apparatus recited in claim 17, wherein the controller is configured to:

compare velocity versus displacement measured via the central impact sensor to determine whether the crash event exceeds an airbag firing threshold; and actuate an airbag in response to the compared velocity versus displacement measured via the central impact sensor crossing an airbag misuse threshold.

22. The apparatus recited in claim 21, wherein the controller is configured to actuate the airbag within as little as 10 milliseconds.

23. The apparatus recited in claim 17, wherein the front impact sensors are crush zone acceleration sensors and the side impact sensors are pillar mounted satellite acceleration sensors.

24. The apparatus recited in claim 14, wherein the controller is configured to:

compare velocity versus displacement measured via the central impact sensor to determine whether the crash event exceeds a seatbelt firing threshold; and actuate an actuatable seatbelt device in response to the compared velocity versus displacement measured via the central impact sensor crossing a seatbelt misuse threshold.

25. The apparatus recited in claim 24, wherein the controller is configured to actuate the actuatable seatbelt device within as little as 10 milliseconds.

26. The apparatus recited in claim 14, wherein the controller discriminates a 90 kph oblique moving deformable barrier crash event.

* * * * *